(12) United States Patent
Schaeffer et al.

(10) Patent No.: US 9,133,871 B2
(45) Date of Patent: Sep. 15, 2015

(54) EXPANSION PLUG

(75) Inventors: Marc Schaeffer, Feldkirch-Nofels (AT); Georg Oberndorfer, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 393 days.

(21) Appl. No.: 13/449,512

(22) Filed: Apr. 18, 2012

(65) Prior Publication Data

US 2013/0097845 A1    Apr. 25, 2013

(30) Foreign Application Priority Data

Apr. 18, 2011 (DE) .......................... 10 2011 007 570

(51) Int. Cl.
*F16B 13/06* (2006.01)
*F16B 13/08* (2006.01)
*F16B 31/02* (2006.01)

(52) U.S. Cl.
CPC .............. *F16B 13/066* (2013.01); *F16B 13/065* (2013.01); *F16B 13/0825* (2013.01); *F16B 31/021* (2013.01); *Y10T 29/49947* (2015.01)

(58) Field of Classification Search
CPC .. F16B 13/066; F16B 13/065; F16B 13/0825; F16B 31/021; Y10T 29/49947
USPC ......... 411/354, 32, 57.1, 60.1, 64, 71, 49–53, 411/33, 39, 43, 59, 60.2; 29/525.05, 522.1, 29/523, 525.01, 525.02, 525.11, 505, 521
See application file for complete search history.

(56) References Cited

U.S. PATENT DOCUMENTS

| | | | | |
|---|---|---|---|---|
| 2,877,818 A * | 3/1959 | Johnson | ......................... | 411/107 |
| 4,011,786 A * | 3/1977 | Liebig | ......................... | 411/60.2 |
| 4,293,259 A * | 10/1981 | Liebig | .............................. | 411/32 |
| 4,376,332 A * | 3/1983 | Sandefur | ................... | 29/402.08 |
| 4,806,053 A * | 2/1989 | Herb | ............................... | 411/32 |
| 5,176,481 A | 1/1993 | Schiefer | ........................ | 411/60 |
| 5,211,512 A | 5/1993 | Frischmann et al. | | |
| 5,228,250 A | 7/1993 | Kesselmann | ...................... | 52/98 |
| 5,413,441 A | 5/1995 | Heminger et al. | .............. | 411/55 |
| 5,634,750 A * | 6/1997 | Frischmann et al. | ........... | 411/33 |
| 6,524,046 B2 * | 2/2003 | Hsu | ................................ | 411/61 |
| 6,676,346 B1 * | 1/2004 | Frischmann et al. | ........... | 411/32 |
| 7,077,610 B2 * | 7/2006 | Diaz | ............................ | 411/344 |
| 7,150,596 B2 * | 12/2006 | Diaz et al. | ..................... | 411/344 |
| 7,628,366 B2 * | 12/2009 | Scott | ............................ | 248/343 |

(Continued)

FOREIGN PATENT DOCUMENTS

DE          22 04 592        8/1973
DE         2353751 A    *    5/1975    ............. F16B 35/06

(Continued)

*Primary Examiner* — Jason L Vaughan
(74) *Attorney, Agent, or Firm* — Davidson, Davidson & Kappel, LLC

(57) ABSTRACT

When it comes to an expansion plug (1) including an anchor bolt (2) with an expansion element (3) on a first end section (6) of the anchor bolt (2) having a longitudinal axis (10), preferably also including at least one force-applier (20) on the anchor bolt (2) in order to hold loads, and also including an expansion sleeve (4) surrounding the anchor bolt (2), the objective is to avoid an axial movement of the expansion sleeve (14), especially in the case of a drilled hole diameter in the lower tolerance range or in the case of a hollow space. The expansion plug (1) has at least one eccentric geometry, so that an expansion of the expansion sleeve (4) can be achieved by a rotational movement of the anchor bolt (2), especially around the longitudinal axis (10) as the axis of rotation (9).

20 Claims, 2 Drawing Sheets

(56) References Cited

U.S. PATENT DOCUMENTS

| | | | |
|---|---|---|---|
| 7,686,555 B1 * | 3/2010 | Larson et al. | 411/367 |
| 8,430,614 B2 * | 4/2013 | Ito et al. | 411/54 |
| 2009/0274534 A1 | 11/2009 | Zimmer et al. | 411/57.1 |

FOREIGN PATENT DOCUMENTS

| | | | | |
|---|---|---|---|---|
| DE | 2658996 | | 6/1978 | |
| DE | 2809583 A1 * | 9/1979 | | F16B 13/00 |
| DE | 3330279 A1 * | 3/1985 | | F16B 13/04 |
| DE | 4231360 A1 * | 9/1992 | | B25G 3/10 |
| DE | 41 16 149 | | 11/1992 | |
| DE | 41 17 238 | | 12/1992 | |
| DE | 10 2007 027831 | | 4/2008 | |
| WO | WO 9407040 A1 * | 3/1994 | | F16B 21/02 |
| WO | WO 2009/128171 A1 * | 10/2009 | | |

* cited by examiner

EXPANSION PLUG

This claims the benefit of German Patent Application DE 10 2011 007 570, filed Apr. 18, 2011 and hereby incorporated by reference herein.

The present invention relates to an expansion plug and to a method for fastening an expansion plug.

BACKGROUND

Expansion plugs with an anchor bolt, an expansion element, force-applying means as well as an expansion sleeve surrounding the anchor bolt serve to fasten workpieces to a structure. For this purpose, a hole is drilled into the structure, for example, a concrete wall or a concrete floor, and then the expansion plug is pushed into the drilled hole. The force-applying means move the conical expansion element axially on the anchor bolt, so that as a result, the expansion element presses the expansion sleeve radially outwards and the expansion plug is anchored due to the radial forces between the expansion sleeve or the expansion element and the structure, for example, the concrete surrounding the drilled hole. In this manner, workpieces or objects can be fastened to the expansion plug.

Therefore, a frictional force between the wall of the drilled hole and the expansion sleeve anchors the expansion plug between the expansion sleeve and the wall of the hole drilled into the structure. The conical expansion elements are generally rotation-symmetrical to a longitudinal axis of the anchor bolt or of the expansion element.

For instance, a thread on the anchor bolt, a washer and a nut are used as the force-applying means. When the nut is screwed onto the thread of the anchor bolt, the washer is pressed against the concrete at the mouth of the drilled hole, thereby causing an axial movement of the anchor bolt and thus also of the conical expansion element. Thus, a torque has to be applied to the nut in order to screw it onto the thread on the anchor bolt or in order to screw it in. When the expansion plug is used in pulling zones, that is to say, in the case of cracked concrete in prestressed concrete in which small cracks appear at the bottom of the prestressed concrete floor, the diameter of the drilled hole becomes larger during the expansion of the expansion sleeve with the expansion element. This results in an additional axial movement of the anchor bolt with the expansion sleeve, the so-called post-expansion, during the radial tensioning of the expansion sleeve on the concrete surrounding the drilled hole. The expansion element, that is to say, here especially the conical geometry of the expansion element, has to be configured in such a way that the requisite expansion force, i.e. the radial pre-tensioning between the expansion sleeve and the concrete surrounding the drilled hole, can be achieved in a lower tolerance range of the drilled hole diameter as well as in an upper tolerance range of the drilled hole diameter. Depending on the varying diameters of the drilled hole within the tolerance range, this leads to different axial movement paths between the anchor bolt and the expansion sleeve. In the case of drilled hole diameters in the upper tolerance range, the expansion sleeve can additionally move relative to the drilled hole (sleeve slippage). In the case of sleeve slippage, the various anchor bolts protrude to a different extent out of the drilled hole when a differing sleeve slippage occurs, and an axial movement of the expansion sleeve towards the mouth of the drilled hole also results in detrimental different anchoring depths of the expansion plug in the drilled hole. The consequence is a greater spread of the breaking load of the expansion plugs.

German patent application DE 41 16 149 A1 describes an expansion plug with an anchor bolt whose cylindrical shank has a widening in the setting direction in one end area and which, for purposes of bearing a load, has force-applying means on the end facing away from this widening, whereby the anchor bolt, at least along part of its shank, is surrounded by an expansion sleeve that can be moved relative thereto, that has at least one lengthwise slit open towards the end on the setting side, and that is provided with radially extending projections on its outer contour.

SUMMARY OF THE INVENTION

It is an object of the present invention to provide an expansion plug with which an axial movement of the expansion sleeve, especially in the case of a drilled hole diameter in the lower tolerance range or in the case of a hollow space, can be avoided.

The present invention provides an expansion plug comprising an anchor bolt with an expansion element on a first end section of the anchor bolt having a longitudinal axis, preferably also comprising at least one force-applying means on the anchor bolt in order to hold loads, and also comprising an expansion sleeve surrounding the anchor bolt, whereby the expansion plug has at least one eccentric geometry, so that an expansion of the expansion sleeve can be achieved by means of a rotational movement of the anchor bolt, especially around the longitudinal axis as the axis of rotation.

Using the at least one eccentric geometry, the expansion sleeve can be expanded without an axial movement of the anchor bolt with the expansion element. An expansion of the expansion sleeve, that is to say, a radial movement of the expansion sleeve in the direction away from the longitudinal axis of the anchor bolt, results in a radial pre-tensioning force between the expansion sleeve and the material, for example, concrete, surrounding the drilled hole. The expansion plug can be anchored in the drilled hole by means of this pre-tensioning between the expansion sleeve and the material surrounding the drilled hole. However, since no axial movement of the anchor bolt is needed to expand the expansion sleeve, which could cause sleeve slippage, that is to say, an axial movement of the expansion sleeve towards the mouth of the drilled hole, any sleeve slippage is ruled out. Only with the rotational movement of the anchor bolt is it possible to expand the expansion sleeve on the material surrounding the drilled hole.

In particular, the expansion plug may comprise several eccentric geometries. A more uniform expansion of the expansion sleeve can be carried out tangentially and circumferentially by means of several eccentric geometries.

In another embodiment, the at least one eccentric geometry is configured on the anchor bolt and/or on the expansion sleeve. Advantageously, one eccentric geometry on the anchor bolt lies on one eccentric geometry on the expansion sleeve.

In a supplementary embodiment, the at least one eccentric geometry is configured on the expansion element or outside of the expansion element on the anchor bolt.

Preferably, the anchor bolt is provided on the other, the second end section with a turning tool socket, e.g. a polygon, and preferably also with a predetermined breaking site for limiting the torque that can be absorbed by the turning tool socket. The turning tool socket can be used to make the expansion plug rotate in order to expand the expansion sleeve by means of the at least one eccentric geometry and in order to bring about a tensioning between the expansion sleeve and the concrete surrounding the drilled hole. The predetermined breaking site prevents any exceeding of the prescribed torque that causes the anchor bolt to rotate. A wrench, for example, can be placed onto the polygon.

As an alternative, it can be provided that the at least one force-applying means has a thread on the anchor bolt and a nut that is arranged on the thread, whereby a means is provided that holds the nut non-rotatably on the thread until a limit torque is exceeded and, after the limit torque has been exceeded, releases the nut so that it can rotate relative to the thread, in particular, this release is irreversible. The means can be implemented in the form of a predetermined breaking site, for example, a pin that extends between the nut and the anchor bolt. The means can also be formed by friction surfaces between the anchor bolt and the nut. According to the present embodiment, the nut is connected non-rotatably to the anchor rod until the limit torque has been reached, which corresponds to the point in time when the setting process is completed. After the limit torque has been reached, the nut can be screwed along the thread. According to this embodiment, a separate turning tool socket can be dispensed with since the setting of the anchor as well as the fastening of the load can be performed with one and the same nut.

In one variant, the at least one eccentric geometry is configured between the anchor bolt and the radial outside of the expansion sleeve, and/or the at least one eccentric geometry is configured in one piece on the anchor bolt or on the expansion sleeve. In the case of a one-piece configuration of the at least one eccentric geometry on the anchor bolt or on the expansion sleeve, this eccentric geometry is especially easy to manufacture at the same time, for example, during the shaping process, and otherwise, an especially tight join exists between the at least one eccentric geometry and the anchor bolt or the expansion sleeve.

Advantageously, the expansion sleeve can be expanded by means of an axial movement of the anchor bolt due to the conical geometry of the expansion element. After the tensioning of the expansion sleeve by means of the at least one eccentric geometry due to a rotational movement of the anchor bolt as the initial expansion, in order to prevent sleeve slippage, an additional expansion of the expansion sleeve on the material surrounding the drilled hole can be carried out by an axial movement of the anchor bolt. For example, also when the expansion plug is used in pulling zones, that is to say, in cracked concrete, there could be a need for a corresponding post-expansion after the initial expansion. Consequently, after the initial expansion has taken place, an additional expansion of the expansion sleeve, for example, as a permanent expansion due to a tensile force acting on the anchor bolt, can be carried out. A permanent expansion of the expansion sleeve is needed so that loads can be permanently fastened to the expansion plug. This permanent expansion, as already mentioned, can be achieved by a tensile force that is permanently acting on the anchor bolt due to the placement of a washer or a nut on the concrete.

In another embodiment, the at least one force-applying means consists of a thread on the anchor bolt, a washer and a nut.

According to the invention, there can also be a nail head on the anchor bolt, in which case a nut can be dispensed with. In order to turn and set the anchor rod, the force-applying means can be configured, for example, as a polygon, that is situated on the nail head.

In particular, the at least one force-applying means is configured at a second end section of the anchor bolt.

In another embodiment, the anchor bolt and/or the expansion element and/or the at least one force-applying means are made at least partially, especially completely, of metal, e.g. steel or aluminum, and/or a method described in this patent application can be carried out with the expansion plug.

The method according to the invention for fastening an expansion plug, especially an expansion plug described in this patent application, comprises the following steps: insertion of the expansion plug into a drilled hole, expansion of an expansion sleeve of the expansion plug so that the expansion sleeve is expanded radially with respect to a wall of the drilled hole, whereby the anchor bolt along with the expansion element is made to rotate, and the expansion sleeve is expanded with at least one eccentric geometry due to the rotational movement. The rotational movement here is preferably a rotational movement by 360° at the maximum. In the case of more than one eccentric geometry, the angle of rotation is preferably 360° divided by the number of active eccentric geometries.

In a supplementary variant, the axis of rotation corresponds to the rotational movement of a longitudinal axis of the anchor bolt.

In another variant, a torque is applied to a turning tool socket on the anchor bolt outside of the drilled hole in order to cause the anchor bolt to rotate along with the expansion element.

In another embodiment, after or during the expansion of the expansion sleeve with the at least one eccentric geometry, the anchor bolt is moved in an axial translational movement towards the mouth of the drilled hole due to the rotational movement of the anchor bolt, and as a result, the expansion sleeve is expanded due to the conical geometry of the expansion element.

In an additional embodiment, the anchor bolt is imparted with the axial translational movement by means of at least one force-applying means, e.g. in that a nut is screwed onto a thread of the anchor bolt. An axial translational movement can be effectuated by screwing the nut to the thread of the anchor bolt, whereby such a screwing process brings about a permanent tensile force on the anchor bolt, and this tensile force leads to a permanent expansion of the expansion sleeve due to the conical geometry of the expansion element. Therefore, after the initial expansion due to the rotational movement of the anchor bolt has taken place, a permanent expansion can be carried out by means of an axial translational movement of the anchor bolt. However, a reverse movement of the expansion sleeve is ruled out due to such a permanent expansion because of the axial translational movement, since a movement of the anchor bolt is ruled out due to the contact that the washer makes with the concrete in the area of the mouth of the drilled hole.

In a supplementary embodiment, the anchor bolt has a bearing ring and the expansion element is supported on the bearing ring, so that the expansion sleeve is supported on the bearing ring when it is being inserted into the drilled hole. When the anchor bolt is being unscrewed with the force-applying means, e.g. the nut, an axial fastening of the expansion sleeve is necessary so that the expansion sleeve can be expanded. This is done by means of a frictional connection, e.g. in that the expansion sleeve is additionally provided with projections.

In a supplementary variant, the expansion sleeve is moved up to a nut of a washer, that is to say, it rests on a force-applying means, and when the anchor bolt is being unscrewed, the axial fixation of the expansion sleeve is not effectuated by friction between the wall of the drilled hole and the expansion sleeve, but rather in that the expansion sleeve rests on at least one force-applying means, e.g. a washer.

BRIEF DESCRIPTION OF THE DRAWINGS

Below, an embodiment of the invention is described in greater detail, making reference to the accompanying drawings. The following is shown.

DETAILED DESCRIPTION

Figure 1:
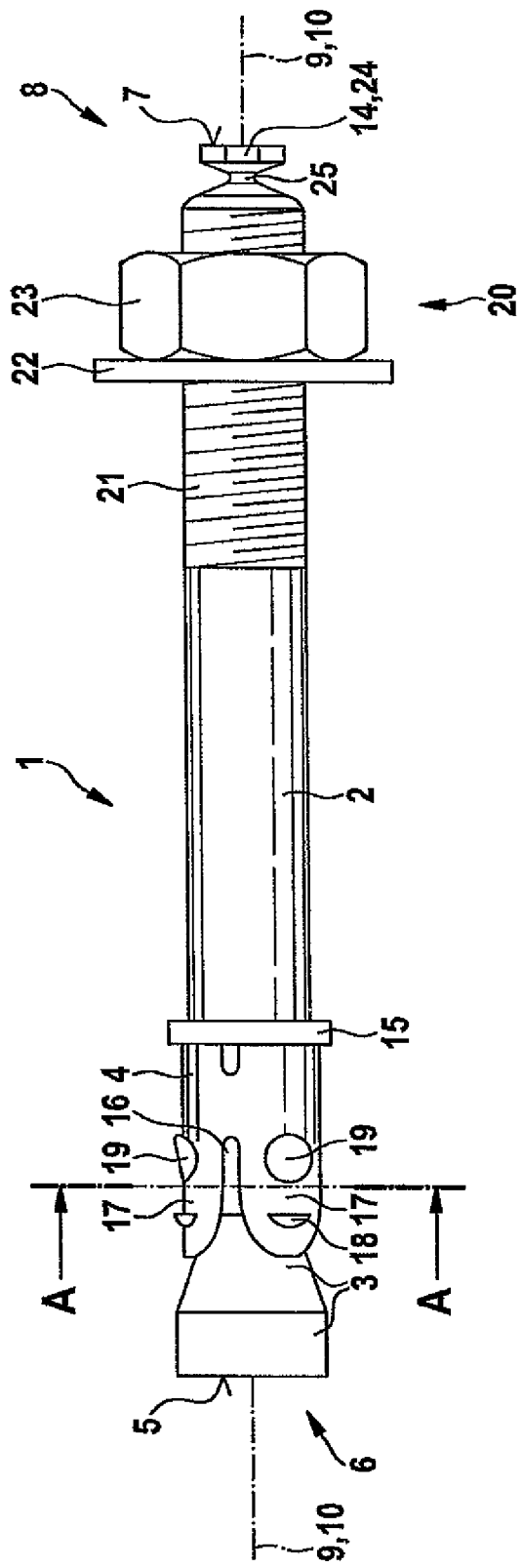
FIG. 1 a lengthwise section of an expansion plug.

An expansion plug 1 shown in FIG. 1 serves to fasten workpieces to a structure. A bore or a drilled hole is made in the structure and, in order to fasten the workpiece, the expansion plug 1 is inserted or hammered into this drilled hole. The structure is, for example, a concrete wall or a concrete floor of a building.

The expansion plug 1 comprises an anchor bolt 2. The anchor bolt 2 has a first end 5 with a first end section 6 and a second end 7 with a second end section 8. When the expansion plug 1 is introduced into a drilled hole of a structure, the first end 5 is inserted into the drilled hole and a second end 7 or else a second end section 8 of the anchor bolt 2 remains outside of the drilled hole. At the first end section 6, a conical expansion element 3 is configured in one piece with the anchor bolt 2. An expansion sleeve 4 is arranged coaxially around the anchor bolt 2 between the expansion element 3 and a support ring 15 that is configured in one piece with the anchor bolt 2. The expansion sleeve 4 rests on the support ring 15 so that, when the expansion plug 1 is pushed into the drilled hole and as a result of the associated frictional forces between the walls of the hole and the expansion sleeve 4, the expansion sleeve 4—since it is resting on the support ring 5—is not moved on the anchor bolt 2 towards the second end 7 (FIG. 1).

The expansion sleeve 4 has three lengthwise slits 16 in the direction of a longitudinal axis 10 of the anchor bolt 2, so that, because of the axial lengthwise slits 16, the expansion sleeve 4 has three expansion segments 17. First projections 18 and second projections 19 are configured on the expansion sleeve 4, especially on the expansion segments 17. The first projections 18 are configured to be closer to the first end 5 of the anchor bolt 2 than the second projections 19. Moreover, the first and second projections 18, 19 preferably have geometries that differ from each other.

Three force-applying means or force appliers 20 are arranged at the second end section 8 of the anchor bolt 2. The force-applying means 20 are in the form of a thread 21 created in the anchor bolt 2, a washer 22 and a nut 23. The nut 23 has an inner thread which engages with the outer thread 21 on the anchor bolt 2. Moreover, on the second end section 8, there is a turning tool socket 14 configured as a polygon 24, and a predetermined breaking site 25, which are configured in one piece with the anchor bolt 2.

In order to fasten workpieces to the expansion plug 1, the expansion plug 1 has to be inserted or hammered into a drilled hole or bore of a structure. After the expansion plug 1 has been pushed into this drilled hole, the first end 5 is located inside the drilled hole and the second end 7 is located outside of the drilled hole.

Figure 2:
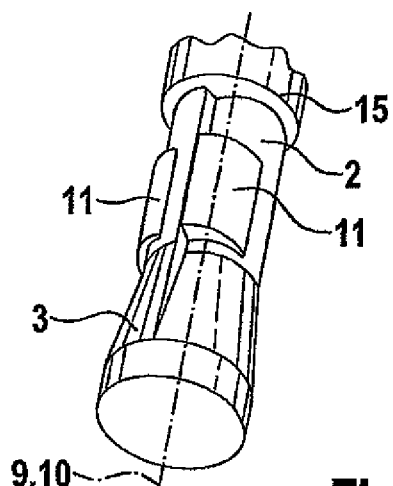
FIG. 2 a perspective partial view of the expansion plug without the expansion sleeve, FIG. 3 a cross section A-A according to FIG. 1 before being turned, and FIG. 4 the cross section A-A according to FIG. 1 after being turned.
Figure 3:
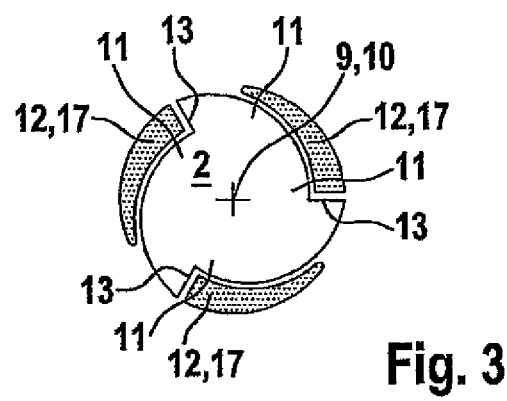
Figure 4:
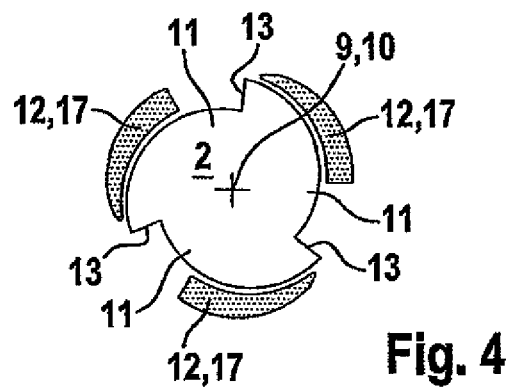

Three eccentric geometries 11 (FIG. 2) are configured on the anchor bolt 2 in the direction of the second end section 8 of the anchor bolt 2 behind the expansion element 3 on the anchor bolt 2. There are likewise three eccentric geometries 12 (FIGS. 3 and 4) on the radial inside of the expansion sleeve 4. Due to the way the sectional view is shown in FIGS. 3 and 4, only the expansion segments 17 with the eccentric geometries 12 configured on them are visible in FIGS. 3 and 4.

After the expansion plug 1 has been pushed into the drilled hole, a wrench is used to apply a torque to the polygon 24 so that the anchor bolt 2 along with the expansion element 3 executes a rotational movement around a rotational axis 9, which corresponds to the longitudinal axis 10 of the anchor bolt 2. Due to the total of three active eccentric geometries 11, 12, after the anchor bolt 2 has been inserted into the drilled hole and before it has been turned, the anchor bolt 2 with the expansion plugs 3 executes an angle of rotation of 120° from the rotational angle position shown in FIG. 3 into the rotational angle position shown in FIG. 4. Due to the geometry of the two eccentric geometries 11, 12 on the anchor bolt 2 and on the expansion sleeve 4, the rotational movement of 120° by the anchor bolt 2 and by the expansion element 3 causes the expansion sleeve 4 to expand, that is to say, to move radially towards the outside, which leads to a radial tensioning between the expansion sleeve 4 and the material at the drilled hole, i.e. concrete. Owing to frictional forces between the expansion sleeve 4 and the wall of the drilled hole as well as owing to a positive connection to the projections 18, 19, the expansion sleeve 4 does not execute a rotational movement around the axis of rotation 9. Therefore, due to the torque applied by the wrench on the polygon 24 and due to the resultant rotational movement of the anchor bolt 2 by an angle of rotation of 120°, including the eccentric geometries 11 on the anchor bolt 2, an initial expansion of the expansion sleeve 4 on the wall of the drilled hole can be carried out. Due to this initial expansion, a non-positive and preferably also a positive connection is created between the expansion sleeve 4 and the concrete surrounding the drilled hole, thus ruling out the possibility of an axial movement of the expansion sleeve 4, i.e. sleeve slippage.

After the initial expansion, the anchor bolt 2, and thus also the expansion element 3, are screwed in the axial direction, outwards relative to the longitudinal axis 10, by means of the force-applying means 20 in that the nut 23 is screwed onto the thread 21, so that as a result, due to the axial fixation as the initial expansion of the expansion sleeve 4, friction forces between the expansion sleeve 4 and the wall of the drilled hole, also due to the projections 18, 19, which also allow a positive connection, cause the expansion sleeve 4 along with the expansion element 3 to be additionally expanded radially towards the outside on the expansion segments 17 as a permanent expansion, so that friction forces and a pre-tensioning between the expansion sleeve 4 and/or the expansion element 3 and the wall of the drilled hole are permanently established for a durable axial fastening of the expansion plug 1 in the drilled hole of the structure.

Therefore, after the expansion plug 1 has been inserted into the drilled hole, in a first work step, an initial expansion is carried out between the expansion sleeve 4 and the concrete surrounding the drilled hole in order to prevent sleeve slippage, that is to say, an axial movement of the expansion sleeve 4 during the execution of the permanent expansion. During the permanent expansion, due to a tensile force in the anchor bolt 2, the anchor bolt 2 is moved axially towards the mouth of the drilled hole since the washer 22 is resting on the concrete in the vicinity of the mouth of the drilled hole. Owing to the initial expansion that has already taken place, however, the expansion sleeve 4 does not execute an axial movement.

All in all, the expansion plug 1 according to the invention is associated with major advantages. The initial expansion carried out at first by means of a rotational movement of the anchor bolt 2 precludes an axial movement of the expansion sleeve 4 during the subsequent permanent expansion due to an axial movement of the anchor bolt 2. As a result, it is advantageously possible to rule out sleeve slippage of the expansion sleeve 4, which would detrimentally lead to a different insertion depth of the expansion plug 1. Owing to the subsequent permanent expansion, even with drilled hole diameters in the upper tolerance range as well as in cases of cracked concrete in prestressed concrete, a permanent expansion of the expansion sleeve 4 can be carried out on the concrete surrounding the drilled hole.

What is claimed is:

1. An expansion plug comprising:
    an anchor bolt with an expansion element on a first end section of the anchor bolt, the anchor bolt having a longitudinal axis,
    an expansion sleeve surrounding the anchor bolt;
    the expansion plug having at least one eccentric geometry so that an expansion of the expansion sleeve is achievable by a rotational movement of the anchor bolt;
    the anchor bolt being provided with a second end section opposite the first end section, the second end section having a turning tool socket and a thread carrying a nut, further comprising a predetermined breaking site for limiting the torque that can be absorbed by the turning tool socket.

2. The expansion plug as recited in claim 1 wherein the rotational movement is around the longitudinal axis as an axis of rotation.

3. The expansion plug as recited in claim 1 further comprising at least one force-applier on the anchor bolt in order to hold loads.

4. The expansion plug as recited in claim 3 wherein the at least one force-applier includes the thread on the anchor bolt, a washer and the nut.

5. The expansion plug as recited in claim 3 wherein the at least one force-applier is configured at a second end section of the anchor bolt.

6. The expansion plug as recited in claim 3 wherein the at least one of the anchor bolt, the expansion element, and the at least one force-applier are made at least partially of metal.

7. The expansion plug as recited in claim 6 wherein the metal is steel or aluminum.

8. The expansion plug as recited in claim 6 wherein the at least one of the anchor bolt, the expansion element, and the at least one force-applier are made completely of metal.

9. The expansion plug as recited in claim 1 wherein the at least one eccentric geometry includes at least two eccentric geometries.

10. The expansion plug as recited in claim 1 wherein the at least one eccentric geometry is configured on at least one of the anchor bolt and the expansion sleeve.

11. The expansion plug as recited in claim 1 wherein the at least one eccentric geometry is configured on the expansion element or outside of the expansion element on the anchor bolt.

12. The expansion plug as recited in claim 1 wherein the turning tool socket is a polygon.

13. The expansion plug as recited in claim 1 wherein the at least one eccentric geometry is configured between the anchor bolt and a radial outside of the expansion sleeve, and/or the at least one eccentric geometry is configured in one piece on the anchor bolt or on the expansion sleeve.

14. The expansion plug as recited in claim 1 wherein the expansion sleeve is expandable by an axial movement of the anchor bolt due to a conical geometry of the expansion element.

15. A method for fastening an expansion plug comprising the following steps:
    providing an expansion plug as recited in claim 1;
    insertion of the expansion plug into a drilled hole; and
    expansion of an expansion sleeve of the expansion plug so that the expansion sleeve is expanded radially with respect to a wall of the drilled hole, an anchor bolt along with the expansion element being imparted with a rotational movement, and the expansion sleeve being expanded with at least one eccentric geometry due to the rotational movement.

16. The method as recited in claim 15 wherein an axis of rotation corresponds to the rotational movement of a longitudinal axis of the anchor bolt.

17. The method as recited in claim 15 further comprising applying a torque to a turning tool socket on the anchor bolt outside of the drilled hole in order to cause the anchor bolt to rotate along with the expansion element.

18. The method as recited in claim 15 wherein, after or during the expansion of the expansion sleeve with the at least one eccentric geometry, the anchor bolt is moved in an axial translational movement towards a mouth of the drilled hole due to the rotational movement of the anchor bolt, and as a result, the expansion sleeve is expanded due to a conical geometry of the expansion element.

19. The method as recited in claim 18 wherein the anchor bolt is imparted with the axial translational movement by at least one force-applier.

20. The method as recited in claim 19 wherein a nut is screwed onto a thread of the anchor bolt, the nut and thread defining the at least one force-applier.

* * * * *